(12) United States Patent
Kang et al.

(10) Patent No.: US 8,150,154 B2
(45) Date of Patent: Apr. 3, 2012

(54) METHOD AND APPARATUS FOR CORRECTING CHROMATIC ABERRATION OF IMAGE

(75) Inventors: Joo-young Kang, Yongin-si (KR); Hyun-wook Ok, Seoul (KR); Seong-deok Lee, Suwon-si (KR); Jae-guyn Lim, Yongin-si (KR)

(73) Assignees: Samsung Electronics Co., Ltd., Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 988 days.

(21) Appl. No.: 12/071,511

(22) Filed: Feb. 21, 2008

(65) Prior Publication Data

US 2009/0052769 A1 Feb. 26, 2009

(30) Foreign Application Priority Data

Aug. 23, 2007 (KR) ........................ 10-2007-0084939

(51) Int. Cl.
*G06K 9/00* (2006.01)
(52) U.S. Cl. ...................................................... 382/167
(58) Field of Classification Search ........... 382/162–167
See application file for complete search history.

(56) References Cited

U.S. PATENT DOCUMENTS

| | | | | |
|---|---|---|---|---|
| 5,581,675 A * | 12/1996 | Shibazaki | ...................... | 345/589 |
| 6,701,009 B1 * | 3/2004 | Makoto et al. | ................. | 382/164 |
| 7,256,828 B2 * | 8/2007 | Nilsson et al. | ................. | 348/273 |
| 7,477,781 B1 * | 1/2009 | Tanbakuchi | ................... | 382/167 |
| 7,630,546 B2 * | 12/2009 | Ishiga | ............................ | 382/167 |
| 7,792,357 B2 * | 9/2010 | Kang | .............................. | 382/167 |
| 7,916,937 B2 * | 3/2011 | Utsugi et al. | ................... | 382/162 |
| 7,952,768 B2 * | 5/2011 | Kwon et al. | .................... | 382/167 |
| 2006/0092298 A1 * | 5/2006 | Ishiga | ............................ | 348/272 |
| 2007/0116375 A1 * | 5/2007 | Utsugi et al. | ................... | 382/264 |
| 2007/0292022 A1 * | 12/2007 | Nilsson et al. | ................ | 382/167 |
| 2008/0137947 A1 * | 6/2008 | Sawada et al. | ................ | 382/167 |

FOREIGN PATENT DOCUMENTS

| | | |
|---|---|---|
| JP | 2000-299874 | 10/2000 |
| JP | 2006-115039 | 4/2006 |
| JP | 2006-238060 | 9/2006 |
| JP | 2006-324974 | 11/2006 |
| KR | 10-2005-0089847 | 9/2005 |
| KR | 10-2006-0041685 | 12/2006 |

\* cited by examiner

*Primary Examiner* — Bhavesh Mehta
*Assistant Examiner* — Sean Motsinger
(74) *Attorney, Agent, or Firm* — Staas & Halsey LLP (57) ABSTRACT

Provided are a method and apparatus for correcting chromatic aberration of an image, the method and apparatus used in an image processing apparatus for an image pickup device or a display image processing apparatus. The chromatic aberration correction apparatus includes a chromatic aberration region sensing unit analyzing a luminance signal of an input image and sensing a region having chromatic aberration; a color gradient calculation unit calculating a first weight, which indicates a degree of chromatic aberration, based on a difference between gradients of color components of the input image; a luminance gradient calculation unit calculating a second weight, which indicates the degree of chromatic aberration, based on gradients of luminance components of the input image; and a chrominance correction unit correcting chrominance of a pixel of the input image, which is included in the sensed region, based on a value obtained by multiplying the first weight by the second weight.

20 Claims, 12 Drawing Sheets
(6 of 12 Drawing Sheet(s) Filed in Color)

| -1 | 0 | 1 |
|----|---|---|
| -2 | 0 | 2 |
| -1 | 0 | 1 |

X-DIRECTION FILTER

| 1 | 2 | 1 |
|---|---|---|
| 0 | 0 | 0 |
| -1 | -2 | -1 |

Y-DIRECTION FILTER

FIG. 3

1 : EDGE
0 : NON-EDGE

| 0 | 0 | 1 |
|---|---|---|
| 0 | 1 | 0 |
| 0 | 0 | 0 |

| 1 | 1 | 1 |
|---|---|---|
| 1 | 1 | 1 |
| 1 | 1 | 1 |

| $R_1$ | $R_2$ | $R_3$ |
|---|---|---|
| $R_4$ | $R_5$ | $R_6$ |
| $R_7$ | $R_8$ | $R_9$ |

PIXEL INDEX
OF R CHANNEL

| $G_1$ | $G_2$ | $G_3$ |
|---|---|---|
| $G_4$ | $G_5$ | $G_6$ |
| $G_7$ | $G_8$ | $G_9$ |

PIXEL INDEX
OF G CHANNEL

| $B_1$ | $B_2$ | $B_3$ |
|---|---|---|
| $B_4$ | $B_5$ | $B_6$ |
| $B_7$ | $B_8$ | $B_9$ |

PIXEL INDEX
OF B CHANNEL

FIG. 8

| $W_{GB,1}$ | $W_{GB,2}$ | $W_{GB,3}$ |
|---|---|---|
| $W_{GB,4}$ | $W_{GB,5}$ | $W_{GB,6}$ |
| $W_{GB,7}$ | $W_{GB,8}$ | $W_{GB,9}$ |

$W_{GB}$

| $W_{GR,1}$ | $W_{GR,2}$ | $W_{GR,3}$ |
|---|---|---|
| $W_{GR,4}$ | $W_{GR,5}$ | $W_{GR,6}$ |
| $W_{GR,7}$ | $W_{GR,8}$ | $W_{GR,9}$ |

| $Y_1$ | $Y_2$ | $Y_3$ |
|---|---|---|
| $Y_4$ | $Y_5$ | $Y_6$ |
| $Y_7$ | $Y_8$ | $Y_9$ |

FIG. 10

| $T_1$ | $T_2$ | $T_3$ |
|---|---|---|
| $T_4$ | 0 | $T_6$ |
| $T_7$ | $T_8$ | $T_9$ |

FIG. 11

| $W_{Y,1}$ | $W_{Y,2}$ | $W_{Y,3}$ |
|---|---|---|
| $W_{Y,4}$ | $W_{Y,5}$ | $W_{Y,6}$ |
| $W_{Y,7}$ | $W_{Y,8}$ | $W_{Y,9}$ |

| $W_{Cb,1}$ | $W_{Cb,2}$ | $W_{Cb,3}$ |
|---|---|---|
| $W_{Cb,4}$ | $W_{Cb,5}$ | $W_{Cb,6}$ |
| $W_{Cb,7}$ | $W_{Cb,8}$ | $W_{Cb,9}$ |

$W_{Cb}$

| $W_{Cr,1}$ | $W_{Cr,2}$ | $W_{Cr,3}$ |
|---|---|---|
| $W_{Cr,4}$ | $W_{Cr,5}$ | $W_{Cr,6}$ |
| $W_{Cr,7}$ | $W_{Cr,8}$ | $W_{Cr,9}$ |

METHOD AND APPARATUS FOR CORRECTING CHROMATIC ABERRATION OF IMAGE

CROSS REFERENCE TO RELATED APPLICATION

This application claims priority from Korean Patent Application No. 10-2007-0084939 filed on Aug. 23, 2007 in the Korean Intellectual Property Office, the disclosure of which is incorporated herein by reference in its entirety.

BACKGROUND OF THE INVENTION

1. Field of the Invention

The present invention relates to image processing, and more particularly, to a method and apparatus for correcting chromatic aberration of an image, the method and apparatus used in an image processing apparatus for an image pickup device or a display image processing apparatus.

2. Description of the Related Art

Generally, when an image is photographed using a camera, there occurs various problems due to aberration of a lens. In particular, image deterioration called chromatic aberration is a serious problem. Chromatic aberration is a phenomenon in which false colors are generated since different wavelengths of light are focused at different positions due to a lens having a different refractive index for the different wavelengths of light. When an image is photographed using a high-magnification lens or an inexpensive lens, such chromatic aberration becomes more apparent. Chromatic aberration may be caused simply by a defect of a lens. However, chromatic aberration may also be caused by a combination of defects of an image sensor, such as a charge coupled device (CCD), and a lens.

In a region near edges of an image, significant differences in luminance appear suddenly. In this edge region, a defect of an image sensor, called blooming, as well as a defect of a lens occurs. Generally, blooming causes chromatic aberration which has very high chrominance (e.g., purple fringes) deflected by a lens. Various types of chromatic aberration may also be caused by a combination of characteristics of a lens and an image sensor.

After going through an image processing process, which is referred to as image restoration and used in digital auto focus technology, an edge region may have more serious chromatic aberration or color artifacts. This is because a degree of image restoration varies according to each wavelength. That is, since edges of an image do not have a degree of blur after an image restoration process, chromatic aberration, which has already occurred, becomes more noticeable.

In order to reduce such chromatic aberration, various methods, such as using a lens made of a special glass material or using a specially processed lens, have been suggested. However, when these methods are used, the cost of manufacturing or processing a lens is increased. Thus, it is difficult to widely use the above methods in cameras other than high-performance cameras such as digital single-lens reflex (DSLR) cameras.

In this regard, it may be more efficient to use technology for removing or correcting chromatic aberration, which is generated in an image already photographed, through image processing. Conventional methods of removing or correcting chromatic aberration through image processing are disclosed in Japanese Patent Publication Nos. 2006-115039 and 2000-299874.

Specifically, Japanese Patent Publication No. 2006-115039 discloses technology for calculating a false color degree, which is defined as a parameter indicative of the possibility that a central pixel of an input image is represented in a false color, and calculating an interpolation value of the central pixel based on values of pixels in a region near the central pixel. The false color degree determines a weight of each pixel for processing a chrominance value, and chromatic aberration is corrected using the weight of each pixel and the false color degree. However, the technology cannot be used to correct chromatic aberration showing various colors which occurs in almost all edges.

In a method of correcting chromatic aberration disclosed in Japanese Patent Publication No. 2000-299874, a reference pixel is designated in an input image, and an amount of chromatic aberration according to the distance from a reference position of the reference pixel is detected. Then, a chromatic aberration characteristic curve representing a cubic equation of the detected amount of chromatic aberration is created, and chromatic aberration is corrected based on the curve. However, the method is designed to correct only transverse chromatic aberration among various chromatic aberrations. In addition, a separate chromatic aberration characteristic curve has to be created for the amount of chromatic aberration which varies according to the distance from the reference position.

SUMMARY OF THE INVENTION

The present invention provides a method and apparatus for efficiently removing or correcting chromatic aberration of a lens, which generally occurs in an edge region, and chromatic aberration caused by blooming which results in significant luminance differences and very strong chrominance in the edge region.

However, the objectives of the present invention are not restricted to the one set forth herein. The above and other objectives of the present invention will become more apparent to one of ordinary skill in the art to which the present invention pertains by referencing the detailed description of the present invention given below.

According to an aspect of the present invention, there is provided a chromatic aberration correction apparatus including a chromatic aberration region sensing unit analyzing a luminance signal of an input image and sensing a region having chromatic aberration; a color gradient calculation unit calculating a first weight, which indicates a degree of chromatic aberration, based on a difference between gradients of color components of the input image; a luminance gradient calculation unit calculating a second weight, which indicates the degree of chromatic aberration, based on gradients of luminance components of the input image; and a chrominance correction unit correcting chrominance of a pixel of the input image, which is included in the sensed region, based on a value obtained by multiplying the first weight by the second weight.

According to another aspect of the present invention, there is provided a chromatic aberration correction method including analyzing a luminance signal of an input image and sensing a region having chromatic aberration; calculating a first weight, which indicates a degree of chromatic aberration, based on a difference between gradients of color components of the input image; calculating a second weight, which indicates the degree of chromatic aberration, based on gradients of luminance components of the input image; and correcting chrominance of a pixel of the input image, which is included in the sensed region, based on a value obtained after multiplying the first weight by the second weight.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail preferred embodiments thereof with reference to the attached drawings in which.

DETAILED DESCRIPTION OF THE INVENTION

The present invention will now be described more fully with reference to the accompanying drawings, in which exemplary embodiments of the invention are shown.

The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Like reference numerals in the drawings denote like elements, and thus their description will be omitted.

The present invention will hereinafter be described in detail with reference to the accompanying drawings.

Chromatic aberration occurs when a picture is taken using a camera. It is a phenomenon in which false colors are produced on an image pickup plane due to a lens material having a different refractive index for different wavelengths of light. There are broadly three types of chromatic aberration. First, longitudinal chromatic aberration (LCA) refers to a color bleeding phenomenon caused by a focal position, which varies according to wavelength, on an optical axis. Second, transverse chromatic aberration (TCA) refers to a phenomenon in which light is focused at different positions around an optical axis since it is not incident parallel to the optical axis. That is, a lens is a direct cause of LCA and TCA. Third, blooming is generally caused by a defect of an image sensor. It is a type of chromatic aberration which is widely visible in the vicinity of edges of an image photographed using a camera that employs a high-magnification lens or an inexpensive lens and which has very strong chrominance. Blooming may occur due to a combination of problems with a lens and an image sensor.

Figure 1:
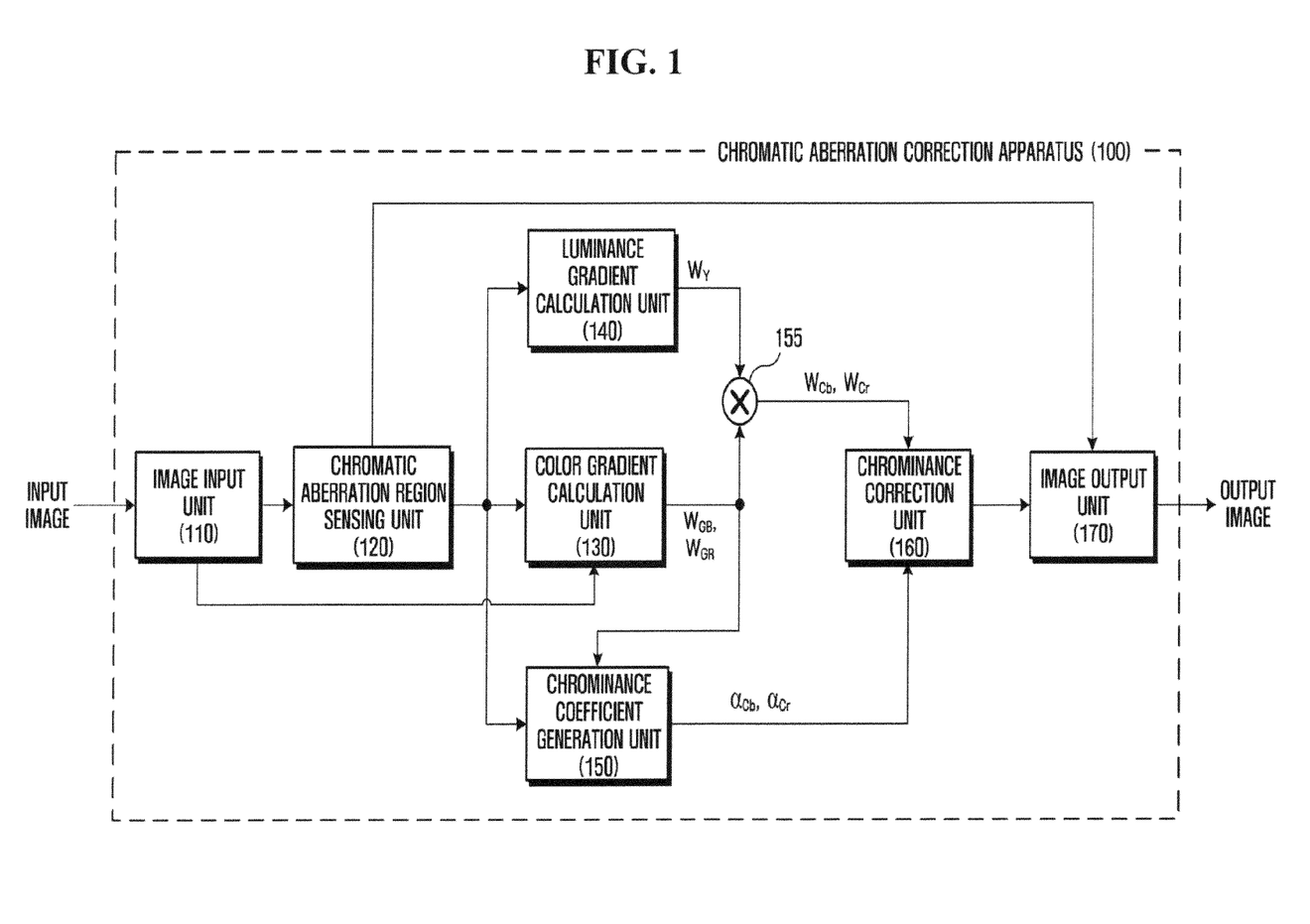
FIG. 1 is a block diagram of a chromatic aberration correction apparatus according to an exemplary embodiment of the present invention.

FIG. 1 illustrates a chromatic aberration correction apparatus 100 for efficiently reducing chromatic aberration caused by various reasons according to an exemplary embodiment of the present invention. Referring to FIG. 1, the chromatic aberration correction apparatus 100 includes an image input unit 110, a chromatic aberration region sensing unit 120, a luminance gradient calculation unit 140, a color gradient calculation unit 130, a chrominance coefficient generation unit 150, a multiplier 155, a chrominance correction unit 160, and an image output unit 170.

The image input unit 110 reads values of pixels that form an input image and divides the read values of the pixels into luminance signals (luminance components) and chrominance signals (chrominance components). For example, if the input image is composed of a red, greed and blue (RGB) signal, the image input unit 110 may convert the RGB signal into a signal which is divided into luminance and chrominance signals, such as an HSV signal, a YUV signal, a YCbCr signal or a YIQ signal. The present invention will be described using the YCbCr signal as an example.

When an input image is composed of an RGB signal, Y, Cb and Cr components of an YCbCr signal may be defined by Equation (1).

$Y = 0.299*R + 0.578*G + 0.114*B$ $Cb = -0.169*R - 0.331*G + 0.5*B$ $Cr = 0.5*R - 0.418*G + 0.082*B$ (1).

Figure 2:
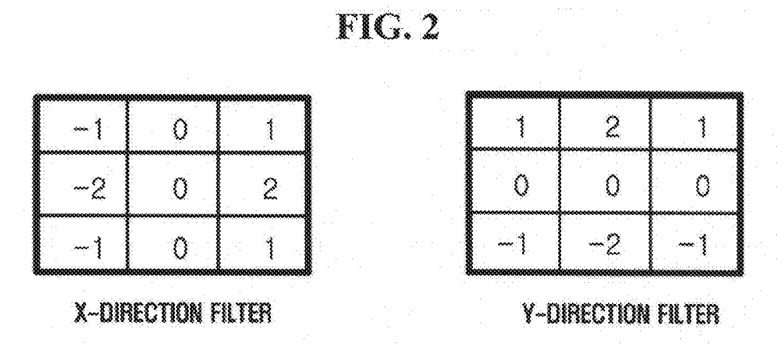
FIG. 2 illustrates a Sobel filter according to an exemplary embodiment of the present invention.

The chromatic aberration region sensing unit 120 senses a chromatic aberration region using the luminance signals. Since chromatic aberration generally occurs in an edge region, sensing the chromatic aberration region may be understood as sensing the edge region. In the present invention, a Sobel filter is used as an algorithm for sensing the edge region. Referring to FIG. 2, the Sobel filter is composed of a 3×3 x-direction filter and a 3×3 y-direction filter. Each of the 3×3 x-direction filter and the 3×3 y-direction filter is applied to 3×3 luminance components centering around a specified luminance component (hereinafter, referred to as a central luminance component). More specifically, components of each of the 3×3 x-direction filter and the 3×3 y-direction filter are multiplied by 3×3 luminance components corresponding to the components of each of the 3×3 x-direction filter and the 3×3 y-direction filter, and the multiplication results are added. If the sum of the multiplication results for the 3×3 x-direction filter is indicated by Sx and that of the multiplication results for the 3×3 y-direction filter is indicated by Sy, a final result S (a Sobel filter value) of applying the Sobel filter to the central luminance component may be given by Equation (2).

$S = \sqrt{S_x^2 + S_y^2}$ (2).

If the Sobel filter value exceeds a predetermined threshold value, the chromatic aberration region sensing unit 120 determines that the central luminance component is positioned at an edge of the input image. However, chromatic aberration does not always occur at an edge of an image and may occur near the edge. Hence, the edge needs to be expanded.

Figure 3:
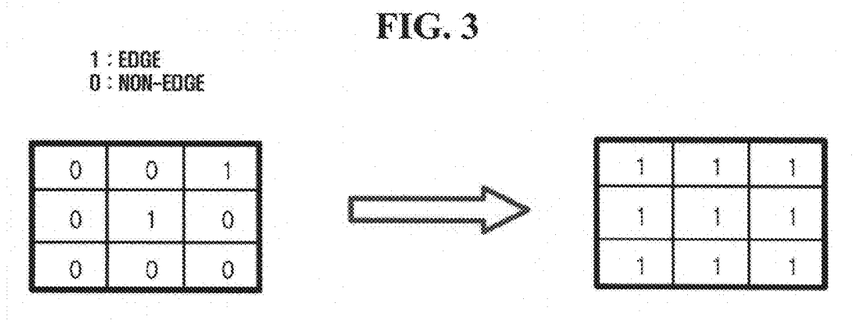
FIG. 3 illustrates a method of expanding an edge according to an exemplary embodiment of the present invention.

The chromatic aberration region sensing unit 120 expands the edge as illustrated in FIG. 3. That is, if a particular luminance component is determined to be an edge, all luminance components included in a region, which has a predetermined size (3×3 in FIG. 3) and has the particular luminance component at its center, are determined to be edges. Such a region is regarded as a chromatic aberration region having chromatic aberration and thus requiring correction of chromatic aberration.

Figure 4:
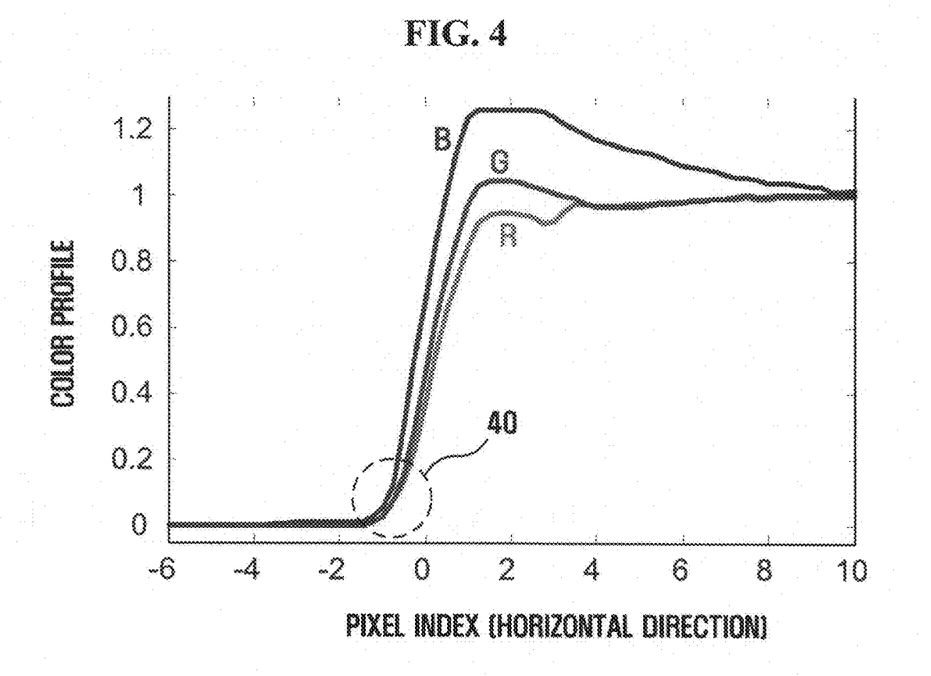
FIG. 4 illustrates an example of a color profile of an image having a small gradient between colors.
Figure 5:
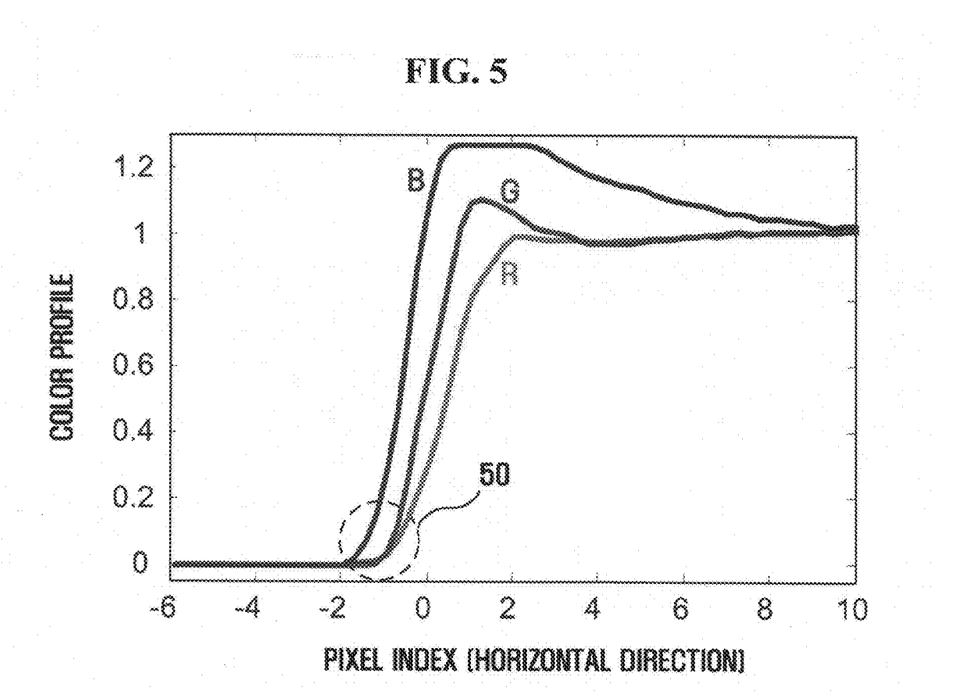
FIG. 5 illustrates an example of a color profile of an image having a large gradient between colors.

The color gradient calculation unit 130 calculates a degree of chromatic aberration based on a gradient difference between color components (hereinafter, referred to as a color gradient) of the input image. The color components are, for example, R, G and B components. FIGS. 4 and 5 are graphs respectively illustrating a color profile of an image having a small gradient between colors and a color profile of an image having a large gradient between colors. A color profile represents the variation in size of each color component (R, G or B component) of a pixel along a horizontal direction of the pixel.

In the image represented by the graph of FIG. 4, a gradient difference between colors in the vicinity of a point at which a pixel index is zero, that is, in an edge region 40, is not significant. However, in the image represented by the graph of FIG. 5, the gradient difference between colors in an edge region 50 is very significant. Therefore, it can be understood that chromatic aberration is highly likely to occur in the edge region 50 of FIG. 5.

Figure 6:
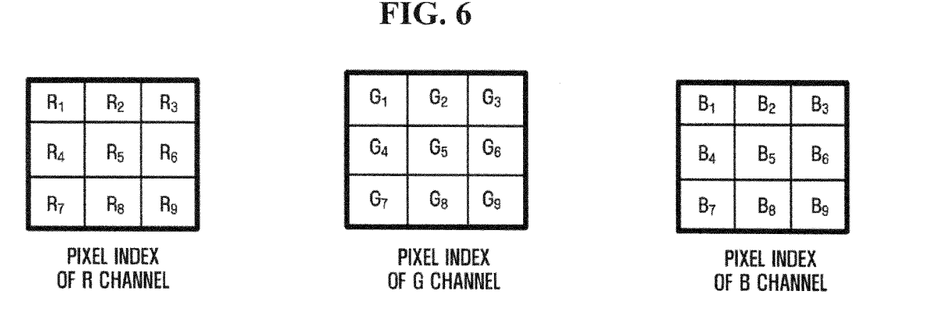
FIG. 6 illustrates a pixel index for each color channel.

For each color, the color gradient calculation unit 130 reads values of pixels included in a block having a predetermined size (e.g., 3×3) and centering around a specified pixel (hereinafter, referred to as a central pixel) which is determined to be included in a chromatic aberration region by the chromatic aberration region sensing unit 120. In FIG. 6, the central pixel is composed of $R_5$, $G_5$ and $B_5$. For example, a pixel to the right of the central pixel is composed of $R_6$, $G_6$ and $B_6$.

For each color, the color gradient calculation unit 130 calculates a gradient (a color gradient) between the central pixel (used as the origin) and an adjacent pixel. For example, color gradients $T_{R,n}$, $T_{G,n}$ and $T_{B,n}$ using a 3×3 block size as illustrated in FIG. 6 may be defined by Equation (3).

$$T_{R,n}=|R_n-R_5|,\ T_{G,n}=|G_n-G_5|,\ T_{B,n}=|B_n-B_5|, \quad (3)$$

where n indicates 1, 2, ..., 9. According to Equation (3), nine color gradients can be calculated for each color. In this case, since a color gradient of a central pixel is zero, only eight color gradients may actually be calculated.

After calculating color gradients for each color, the color gradient calculation unit 130 calculates differences between color gradients of two colors. In the YCbCr signal, since Cb and Cr, which are chrominance signals, are calculated based on the G component, the differences between the color gradients may be calculated based on the G component.

Therefore, differences $D_{GB,n}$ and $D_{GR,n}$ between color gradients based on the G component may be defined by Equation (4).

$$D_{GB,n}=|T_{G,n}-T_{B,n}|,\ D_{GR,n}=|T_{G,n}-T_{R,n}| \quad (4).$$

Using the calculated differences $D_{GB,n}$ and $D_{GR,n}$ between the color gradients, the color gradient calculation unit 130 calculates first weights $W_{GB}$ and $W_{GR}$. The first weight $W_{GB}$ for the Cb component is obtained from the difference $D_{GB,n}$, and the first weight $W_{GR}$ for the Cr component is obtained from the difference $D_{GR,n}$. It can be anticipated that chromatic aberration will become more visible as the first weights $W_{GB}$ and $W_{GR}$ are increased.

Figure 7:
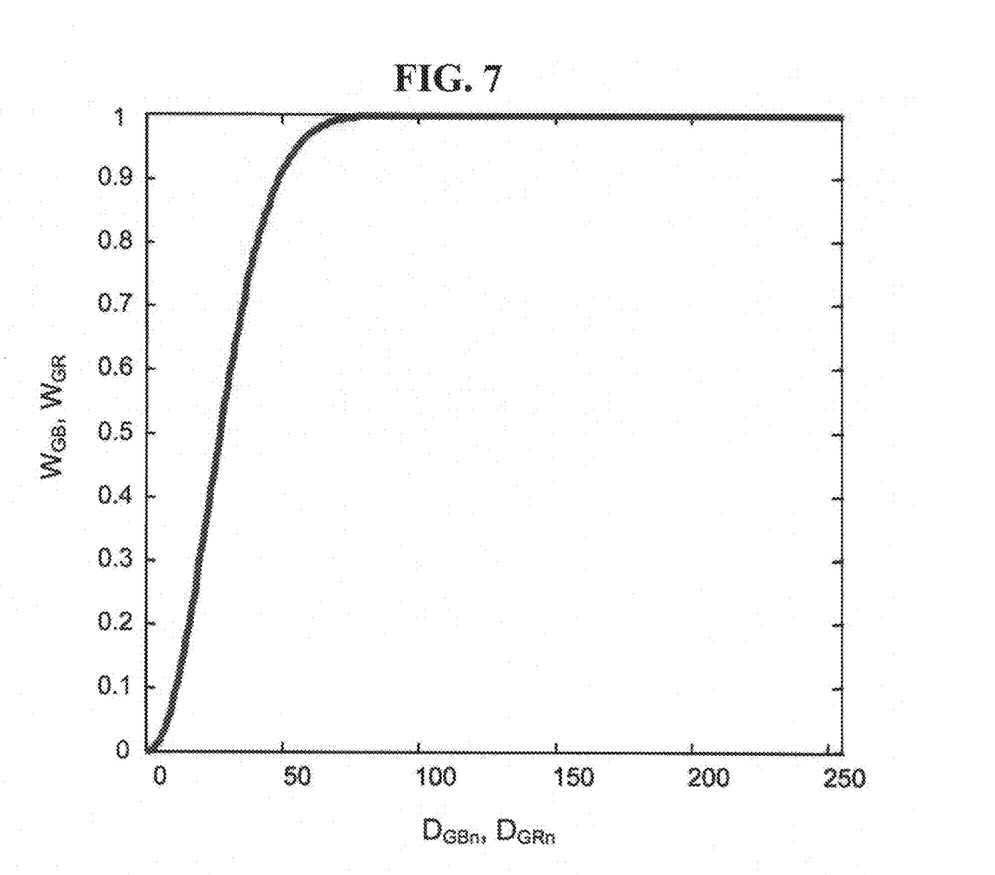
FIG. 7 illustrates an example of a curve representing the relationship between difference in color gradient and a first weight.

The first weights $W_{GB}$ and $W_{GR}$ may be increased as the differences $D_{GB,n}$ and $D_{GR,n}$ between the color gradients increase. For example, a curve of the first weights $W_{GB}$ and $W_{GR}$ which can be selected according to the differences $D_{GB,n}$ and $D_{GR,n}$ may be as illustrated in FIG. 7. The overall performance of the chromatic aberration correction apparatus 100 may vary according to the curve. Therefore, an optimal curve needs to be selected in consideration of characteristics of a lens used to take a picture of the input image. The curve roughly takes the form of a monotonically increasing function. In the curve, if the differences $D_{GB,n}$ and $D_{GR,n}$ between the color gradients exceed a predetermined value, the first weights $W_{GB}$ and $W_{GR}$ are all set to one. This is because the differences $D_{GB,n}$ and $D_{GR,n}$ between the color gradients are not great at edges of an image without chromatic aberration.

Figure 8:
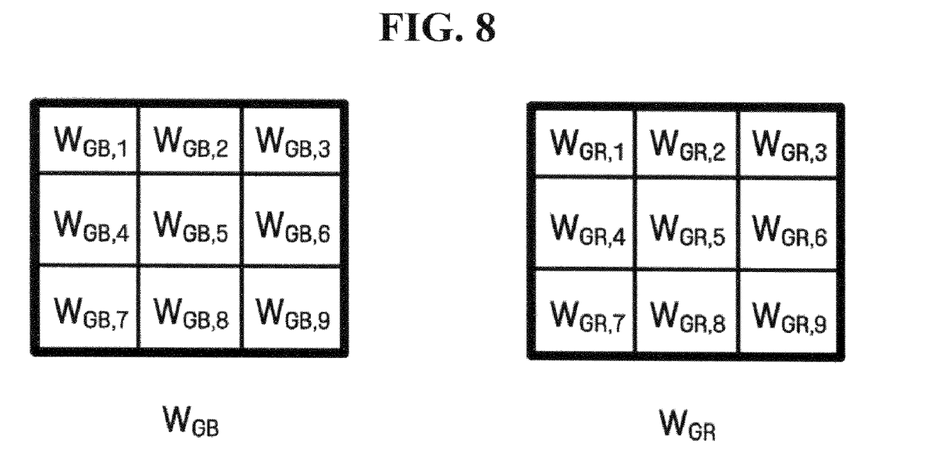
FIG. 8 illustrates components of the first weight.

With respect to a central pixel, each of the first weights $W_{GB}$ and $W_{GR}$ may be represented by a 3×3 block, i.e., nine values, as illustrated in FIG. 8. Since $W_{GB,5}$ and $W_{GR,5}$ are zero, no calculation is required.

Referring back to FIG. 1, the luminance gradient calculation unit 140 calculates the degree of chromatic aberration using gradients of luminance components (hereinafter, referred to as luminance gradients) of the input image.

The luminance gradient calculation unit 140 reads values of pixels included in a block having a predetermined size (e.g., 3×3) and centering around a central pixel which is determined to be included in a chromatic aberration region by the chromatic aberration region sensing unit 120. In a 3×3 block of FIG. 9, $Y_5$ indicates a luminance component (a central luminance component) of the central pixel, and $Y_6$ indicates a luminance component of a pixel to the right of the central pixel.

Figure 9:
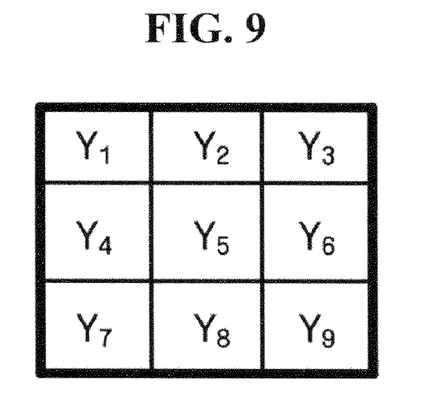
FIG. 9 illustrates luminance components in a block of a predetermined size.
Figure 10:
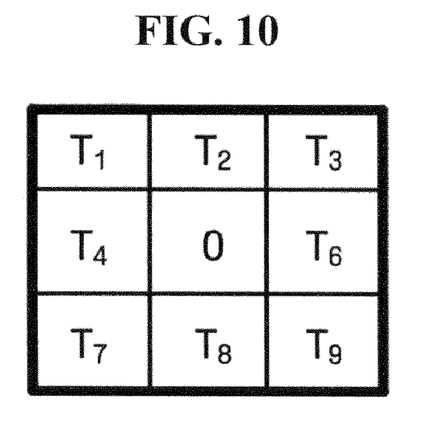
FIG. 10 illustrates luminance gradients in a block of a predetermined size.
Figure 11:
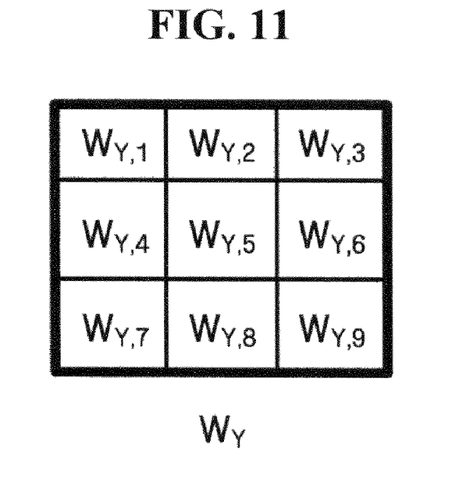
FIG. 11 illustrates components of a second weight.

A luminance gradient $T_n$ of each luminance component in the 3×3 block of FIG. 9 having the luminance component $Y_5$ of the central pixel at its center may be represented as in FIG. 10. The luminance gradient $T_n$ satisfies Equation (5) below.

$$T_n=|Y_n-Y_5| \quad (5)$$

where n indicates 1, 2, ..., 9. After calculating the luminance gradient $T_n$ as described above, the luminance gradient calculation unit 140 calculates a second weight $W_Y$ corresponding to the luminance gradient $T_n$. Therefore, the second weight $W_Y$ may be represented by a 3×3 block, i.e., nine values, as illustrated in FIG. 11. Since $W_{Y,5}$ is zero, no calculation is required.

In order to efficiently correct various types of chromatic aberration, it is important to properly set the relationship between the luminance gradient $T_n$ and the second weight $W_Y$. This is because a larger luminance gradient is not necessarily translated into a greater degree of chromatic aberration.

Figure 12:
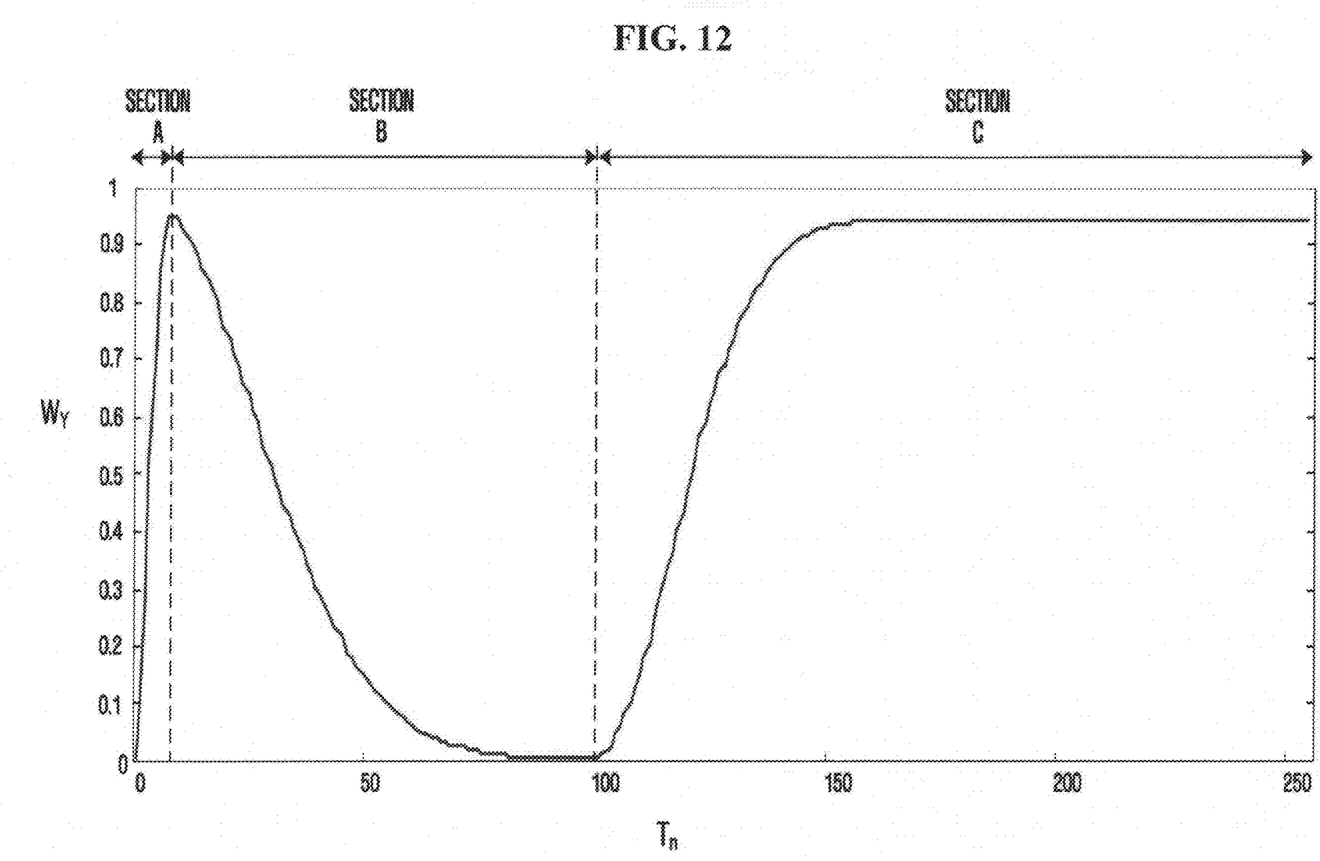
FIG. 12 illustrates an example of a curve representing the relationship between luminance gradient and the second weight.

In the present invention, a curve as illustrated in FIG. 12 is used in order to set the relationship between the luminance gradient $T_n$ and the second weight $W_Y$ in consideration of various types of chromatic aberrations. The curve may broadly be divided into sections a through c.

An assumption applied to section a (a first monotonically increasing section) is that a pixel similar to a central pixel is hardly likely to have chromatic aberration and that a pixel significantly different from the central pixel is highly likely to have chromatic aberration is applied. Therefore, in section a, the second weight $W_Y$ tends to increase with the luminance gradient $T_n$. It can be understood that section a is where LCA or TCA often occurs. In general, LCA or TCA does not excessively increase the luminance gradient $T_n$ above a predetermined threshold value.

Therefore, if the luminance gradient $T_n$ exceeds the predetermined threshold value, it may have been caused by natural luminance differences between pixels of an image rather than by chromatic aberration. Therefore, in section b (a monotonically decreasing section), the second weight $W_Y$ tends to decrease with the luminance gradient $T_n$.

In the case of chromatic aberration such as blooming or purple fringes, there is a very large luminance gradient between a region with chromatic aberration and a normal region without chromatic aberration. This type of chromatic aberration occurs in a region having a luminance gradient of more than approximately 100 based on a 256 grayscale. Considering such chromatic aberration with a very large luminance gradient, a curve pattern in section c (a second monotonically increasing section) of FIG. 12 is required. In section c, the second weight $W_Y$ generally increases with the luminance gradient $T_n$. If the luminance gradient $T_n$ reaches a certain level, the second weight $W_Y$ is saturated and thus has a constant value thereafter.

As described above, the curve for setting the relationship between the luminance gradient $T_n$ and the second weight $W_Y$ may include a first monotonically increasing function, a monotonically decreasing function, and a second monotonically increasing function.

Although stochastic feasibility exists between the second weight $W_Y$ obtained according to the curve pattern (in particular, section c) of FIG. 12 and actual chromatic aberration, there is also a possibility that some regions without chromatic aberration in an image may be determined to have chromatic aberration. For example, although chromatic aberration does not actually exist in an edge portion of an image with high contrast, the second weight $W_Y$ may be increased due to a large luminance gradient $T_n$.

The possibility of such an error occurring may be removed or reduced when the first weights $W_{GB}$ and $W_{GR}$ calculated by the color gradient calculation unit 130 are multiplied by the second weight $W_Y$. Since the first weights $W_{GB}$ and $W_{GR}$ are calculated based on the differences $D_{GB,n}$ and $D_{GR,n}$ between the color gradients, they represent the degree of chromatic aberration. Thus, if the first weights $W_{GB}$ and $W_{GR}$ are multiplied by the second weight $W_Y$, the error of the second weight $W_Y$ can be corrected. For example, in a normal image with high contrast, the first weights $W_{GB}$ and $W_{GR}$ may have values close to zero. Therefore, even if the second weight $W_Y$ is close to one, a value obtained after the first weights $W_{GB}$ and $W_{GR}$ are multiplied by the second weight $W_Y$ is close to zero.

The multiplier 155 multiplies the first weights $W_{GB}$ and $W_{GR}$ by the second weight $W_Y$ and produces third weights $W_{Cb}$ and $W_{Cr}$ which determine the degree to which chromatic aberration is to be corrected, as in Equation (6). In Equation (6), $W_{Cb}$ indicates a weight used to correct the Cb signal of the YCbCr signal, and $W_{Cr}$ indicates a weight used to correct the Cr signal of the YCbCr signal.

$$W_{Cb} = W_{GB} \times W_Y$$

$$W_{Cr} = W_{GR} \times W_Y \quad (6).$$

Figure 13:
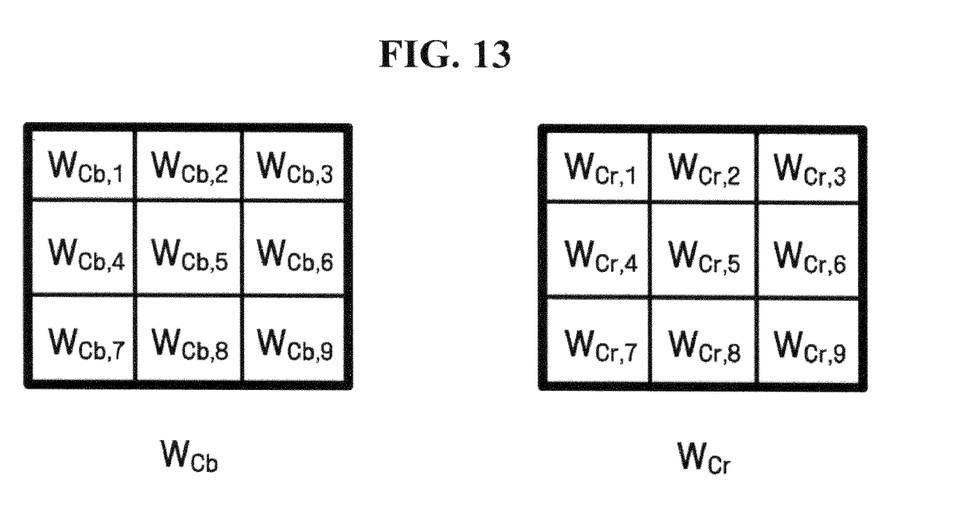
FIG. 13 illustrates components of a third weight.

Since the first weights $W_{GB}$ and $W_{GR}$ and the second weight $W_Y$ have the same block size (e.g., 3×3), the third weights $W_{Cb}$ and $W_{Cr}$ also have the block size as illustrated in FIG. 13. Since $W_{Cb,5}$ and $W_{Cr,5}$ are zero, no calculation is required.

Using the third weights $W_{Cb}$ and $W_{Cr}$ obtained from the multiplier 155, the chrominance correction unit 160 corrects chrominance components (Cb and Cr components) of pixels which are determined to be included in a chromatic aberration region by the chromatic aberration region sensing unit 120. Specifically, referring to FIG. 13, the chrominance correction unit 160 applies each of the 3×3 third weights $W_{Cb}$ and $W_{Cr}$ to 3×3 chrominance components which center around a chrominance component (a central chrominance component $C_{b5}$ or $C_{r5}$) to be corrected. That is, the chrominance correction unit 160 corrects the central chrominance component $C_{b5}$ or $C_{r5}$ by calculating a weighted mean of the chrominance components using the third weight $W_{Cb}$ or $W_{Cr}$ as shown in Equation (7). In Equation (7), $Cb_5'$ and $Cr_5'$ respectively indicate corrected central chrominance components.

$$Cb_5' = \frac{\sum_{n=1}^{9} W_{Cb,n} \times Cb_n}{\sum_{n=1}^{9} W_{Cb,n}}, \quad Cr_5' = \frac{\sum_{n=1}^{9} W_{Cr,n} \times Cb_n}{\sum_{n=1}^{9} W_{Cr,n}}. \quad (7)$$

As described above, information regarding pixels (e.g., eight pixels) adjacent to a particular pixel is used to correct chrominance components of the particular pixel.

However, the above method of correcting chrominance may not be sufficient to correct special chromatic aberration which is characterized by strong chrominance noticeable in a wide area of an image. By taking this fact into consideration, the present invention suggests a method of additionally correcting chrominance of a central pixel using a chrominance modeling function, which is based on optical characteristics of a lens or an image sensor, and chrominances of pixels adjacent to the central pixel. The method increases a weight using the chrominances of the adjacent pixels so that a chromatic aberration region with strong chrominance can become achromatic or have chrominance close to that of the adjacent pixels.

Figure 14:
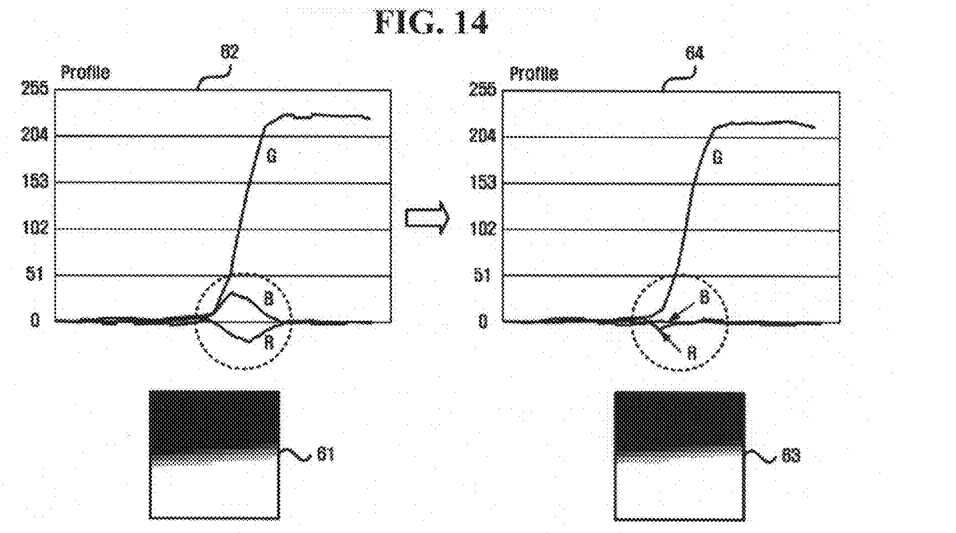
FIG. 14 compares an image having chromatic aberration to an image obtained after the image is corrected.

FIG. 14 compares an image 61 having chromatic aberration to an image 63 obtained after the image 61 is corrected using the above method. While there is a large difference between B and R components in a color profile 62 of the image 61 before being corrected, the difference between the B and R components is reduced in a color profile 64 of the image 63 obtained after the image 61 is corrected. That is, chromatic aberration visible in a wide area is removed.

Referring to FIG. 2, the chrominance coefficient generation unit 150 obtains a chrominance modeling function which is based on optical characteristics (parameters) of a lens or an image sensor and generates chrominance coefficients by applying chrominance of a pixel that is to be corrected and pixels adjacent to the pixel to the chrominance modeling function. The chrominance modeling function is a probability density function indicating at which chrominance value a lens is highly likely to cause chromatic aberration.

Figure 15:
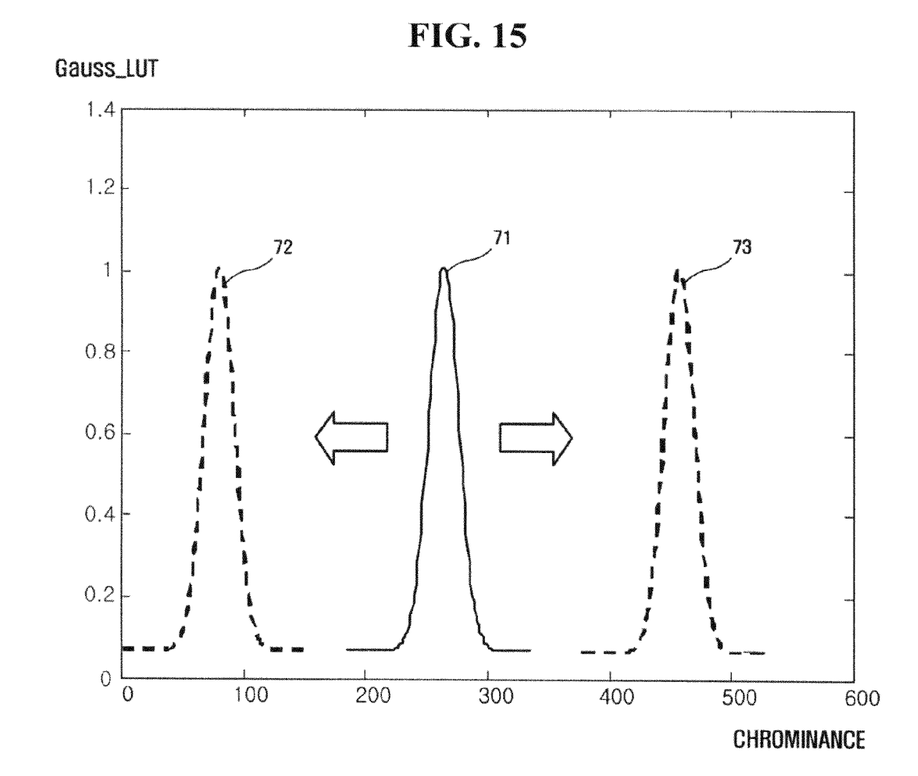
FIG. 15 illustrates an example of a Gaussian distribution according to a chrominance component.

Since the chrominance modeling function is based on statistics, it may follow, for example, a Gaussian distribution. In the Gaussian distribution, mean and standard deviation are determined by characteristics of a lens. Since the lens may have different characteristics for each of the Cb and Cr components, the Gaussian distribution may also be obtained for each of the Cb and Cr components. For example, referring to FIG. 15, if the Cb component follows a Gaussian distribution 71 according to characteristics of a lens, the Cr component may follow another Gaussian distribution 72 or 73. In FIG. 15, Gauss_LUT indicates a Gaussian distribution function or a Gaussian lookup table.

If each of 3×3 chrominance components is substituted for Gauss_LUT, a total of nine values may be obtained for each of the Cb and Cr components. The chrominance coefficient generation unit 150 may generate chrominance coefficients by multiplying the nine values by each of the first weights $W_{GB}$ and $W_{GR}$. A more specific relational expression for obtaining chrominance coefficients $\alpha_{Cb}$ and $\alpha_{Cr}$ is defined by Equation (8). In Equation (8), $\beta$ is a constant for controlling the size of a chrominance coefficient.

$$\alpha_{Cb} = \beta \times W_{GB} \times \text{Gauss\_LUT}(Cb)$$

$$\alpha_{Cr} = \beta \times W_{GR} \times \text{Gauss\_LUT}(Cr) \qquad (8).$$

In Equation (8), since each of $W_{GB}$, $W_{GR}$, Cb and Cr is composed of nine values, each of the chrominance coefficients $\alpha_{Cb}$ and $\alpha_{Cr}$ has nine values, that is, a 3×3 block size. In addition, each of the chrominance coefficients $\alpha_{Cb}$ and $\alpha_{Cr}$ is added to a denominator of Equation (7), thereby providing an additional chrominance correction (reduction) effect.

The chrominance correction unit 160 may additionally apply the chrominance coefficients $\alpha_{Cb}$ and $\alpha_{Cr}$ to Equation (7) and obtain corrected chrominance components as defined by Equation (9).

$$Cb'_S = \frac{\sum_{n=1}^{9} W_{Cb,n} \times Cb_n}{\sum_{n=1}^{9} (W_{Cb,n} + \alpha_{Cb,n})}, \quad Cr'_S = \frac{\sum_{n=1}^{9} W_{Cr,n} \times Cb_n}{\sum_{n=1}^{9} (W_{Cr,n} + \alpha_{Cb,n})}. \qquad (9)$$

As described above, information regarding pixels (e.g., eight pixels) adjacent to a particular pixel (a central pixel in a block of a predetermined size) is used to correct chrominance components of the particular pixel.

The image output unit 170 outputs chrominance components, which are determined not to be included in a chromatic aberration region by the chromatic aberration region sensing unit 120, as they are and outputs chrominance components, which are determined to be included in the chromatic aberration region, as values corrected by the chrominance correction unit 160. In this case, the image output unit 170 may convert a signal which is divided into luminance and chrominance signals, into an RGB signal that can be displayed on a display screen.

Each component described above with reference to FIGS. 2 through 6 may be implemented as a software component, such as a task, a class, a subroutine, a process, an object, an execution thread or a program performed in a predetermined region of a memory, or a hardware component, such as a Field Programmable Gate Array (FPGA) or Application Specific Integrated Circuit (ASIC). In addition, the components may be composed of a combination of the software and hardware components. The components may be reside on a computer-readable storage medium or may be distributed over a plurality of computers.

Chromatic aberration correction technology according to the present invention can efficiently remove various types of chromatic aberration, such as LCA, TCA and blooming.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A chromatic aberration correction apparatus comprising:
    a processor comprising:
        a chromatic aberration region sensing unit analyzing a luminance signal of an input image and sensing a region having chromatic aberration;
        a color gradient calculation unit calculating a first weight, which indicates a degree of chromatic aberration, based on a difference between gradients of color components of the input image;
        a luminance gradient calculation unit calculating a second weight, which indicates the degree of chromatic aberration, based on gradients of luminance components of the input image; and
        a chrominance correction unit correcting chrominance of a pixel of the input image, which is included in the sensed region, based on a value obtained by multiplying the first weight by the second weight.

2. The apparatus of claim 1, further comprising a chrominance coefficient generation unit obtaining a chrominance modeling function, which is based on optical characteristics of a lens or an image sensor, and generating a chrominance coefficient by multiplying a result of applying a chrominance component to the chrominance modeling function by the first weight, wherein the chrominance correction unit additionally corrects the chrominance of the pixel of the input image using the chrominance coefficient.

3. The apparatus of claim 2, wherein the chrominance modeling function has a different Gaussian distribution for each chrominance component.

4. The apparatus of claim 2, wherein the chrominance correction unit corrects the chrominance of the pixel of the input image to become significantly lower as the chrominance coefficient is increased.

5. The apparatus of claim 1, wherein, if a result of applying a Sobel filter to a pixel of the input image exceeds a predetermined threshold value, the chromatic aberration region sensing unit determines that the pixel has chromatic aberration.

6. The apparatus of claim 5, wherein, if any one of pixels included in a block of a predetermined size has chromatic aberration, the chromatic aberration region sensing unit determines that all of the pixels in the block have chromatic aberration.

7. The apparatus of claim 1, wherein the color gradient calculation unit calculates the first weight by calculating color gradients between a central pixel and each pixel adjacent to the central pixel for each color component, calculating a difference between the calculated gradients, and applying the calculated difference to a monotonically increasing function.

8. The apparatus of claim 1, wherein the luminance gradient calculation unit calculates the second weight by calculating a gradient between a luminance component of a pixel of the input image and a luminance component of each pixel adjacent to the pixel and applying the calculated gradient to a predetermined function.

9. The apparatus of claim 8, wherein the predetermined function comprises a first monotonically increasing section, a monotonically decreasing section, and a second monotonically increasing section.

10. The apparatus of claim 1, wherein the chrominance correction unit calculates a weighted mean of the chrominance of the pixel included in the sensed region and chrominances of pixels adjacent to the pixel using the value obtained after the multiplication as a weight and corrects the chrominance of the pixel included in the sensed region based on the weighted mean.

11. A chromatic aberration correction method comprising:
analyzing a luminance signal of an input image and sensing a region having chromatic aberration;
calculating a first weight, which indicates a degree of chromatic aberration, based on a difference between gradients of color components of the input image;
calculating, by a processor, a second weight, which indicates the degree of chromatic aberration, based on gradients of luminance components of the input image; and
correcting chrominance of a pixel of the input image, which is included in the sensed region, based on a value obtained after multiplying the first weight by the second weight.

12. The method of claim 11, further comprising:
obtaining a chrominance modeling function which is based on optical characteristics of a lens or an image sensor; and
generating a chrominance coefficient by multiplying a result of applying a chrominance component to the chrominance modeling function by the first weight,
wherein the correcting of the chrominance comprises additionally correcting the chrominance of the pixel of the input image using the chrominance coefficient.

13. The method of claim 12, wherein the chrominance modeling function has a different Gaussian distribution for each chrominance component.

14. The method of claim 12, wherein the correcting of the chrominance further comprises correcting the chrominance of the pixel of the input image to become significantly lower as the chrominance coefficient is increased.

15. The method of claim 11, wherein the sensing of the region having chromatic aberration comprises, if a result of applying a Sobel filter to a pixel of the input image exceeds a predetermined threshold value, determining that the pixel has chromatic aberration.

16. The method of claim 15, wherein the sensing of the region having chromatic aberration further comprises, if any one of pixels included in a block of a predetermined size has chromatic aberration, determining that all of the pixels in the block have chromatic aberration.

17. The method of claim 11, wherein the calculating of the first weight comprises:
calculating gradients between a central pixel and each pixel adjacent to the central pixel for each color component;
calculating a difference between the calculated gradients; and
applying the calculated difference to a monotonically increasing function.

18. The method of claim 11, wherein the calculating of the second weight comprises:
calculating a gradient between a luminance component of a pixel of the input image and a luminance component of each pixel adjacent to the pixel; and
applying the calculated gradient to a predetermined function.

19. The method of claim 18, wherein the predetermined function comprises a first monotonically increasing section, a monotonically decreasing section, and a second monotonically increasing section.

20. The method of claim 11, wherein the correcting of the chrominance comprises:
calculating a weighted mean of the chrominance of the pixel included in the sensed region and chrominances of pixels adjacent to the pixel using the value obtained after the multiplication as a weight; and
correcting the chrominance of the pixel included in the sensed region based on the weighted mean.

* * * * *